(12) United States Patent  (10) Patent No.: US 8,378,605 B2
Wang et al.  (45) Date of Patent: Feb. 19, 2013

(54) METHOD AND APPARATUS FOR MONITORING A SYSTEM INCLUDING A SENSORLESS ELECTRIC MOTOR

(75) Inventors: Wei D. Wang, Troy, MI (US);
Nitinkumar R. Patel, Cypress, CA (US); Yo Chan Son, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 476 days.

(21) Appl. No.: 12/652,931

(22) Filed: Jan. 6, 2010

(65) Prior Publication Data
US 2011/0163704 A1  Jul. 7, 2011

(51) Int. Cl.
*H02P 6/00* (2006.01)
(52) U.S. Cl. ............. 318/400.32; 318/400.01; 318/721; 318/799; 417/2; 417/44.1

(58) Field of Classification Search ............. 318/400.01, 318/400.02, 400.32, 432, 400.21, 721, 799; 324/500; 361/22, 23; 417/2, 15, 44.1, 44.11
See application file for complete search history.

(56) References Cited

U.S. PATENT DOCUMENTS

| | | | |
|---|---|---|---|
| 6,675,577 B2 * | 1/2004 | Evans | 60/445 |
| 7,572,204 B2 * | 8/2009 | Doering et al. | 477/203 |
| 7,999,496 B2 * | 8/2011 | Gleason et al. | 318/139 |
| 8,115,428 B2 * | 2/2012 | Williams et al. | 318/400.02 |

* cited by examiner

*Primary Examiner* — Antony M Paul

(57) ABSTRACT

A multiphase alternating current permanent magnet synchronous electric motor is coupled to an actuator. A sensorless electric motor drive control system controls operation of the electric motor. An initial phase angle and a rotational speed of a rotor of the electric motor are estimated. Operation of the sensorless electric motor drive control system and the electric motor are monitored using the estimated initial phase angle and the estimated rotational speed of the rotor of the electric motor. A fault in one of the sensorless electric motor drive control system and the electric motor is detected based upon the monitored operation.

14 Claims, 6 Drawing Sheets

US 8,378,605 B2

METHOD AND APPARATUS FOR MONITORING A SYSTEM INCLUDING A SENSORLESS ELECTRIC MOTOR

TECHNICAL FIELD

This disclosure is related to the monitoring of systems including electric motors. More specifically, the disclosure relates to monitoring operation of a sensorless electric motor.

BACKGROUND

The statements in this section merely provide background information related to the present disclosure and may not constitute prior art.

Hybrid powertrain systems include electric power systems including high voltage electric energy devices that supply electric power to multiphase electric motors via electric power inverters that convert stored DC electric power to AC electric power. The multiphase electric motors can be used to provide tractive torque and provide power to accessory devices, including, e.g., auxiliary hydraulic pumps and HVAC compressors.

Known motor control systems may include a position feedback sensor such as a resolver or encoder to monitor rotational speed and position of an electric motor. Feedback devices and associated interface circuits add complexity to a motor control system in the form of added components, added weight, and added wiring harness complexity. The additional system complexity may affect assembly time, serviceability, and in-use performance.

An electric power system can use an electric motor control technology such as vector motor control to control operation of electric motors. A vector motor control scheme is a computationally intensive motor control scheme that maps the phase voltages and currents of a three-phase motor into a two-axis coordinate system. One known configuration for exciting a multiphase-phase AC electric motor using a vector control scheme is a multiphase-phase electric power inverter including power transistors that transform DC electric power to multiphase AC output power. Vector control requires rotor position information, which can be obtained via a feedback device or position sensor.

Known position sensorless control systems determine rotor position information using electromagnetic characteristics of the multiphase AC machine, thus eliminating a need for a position feedback sensor and its associated interface circuits.

Control systems for powertrain systems including hybrid powertrain systems monitor operation to detect occurrence of faults in components and systems that can affect emissions.

SUMMARY

A method for monitoring a multiphase alternating current permanent magnet synchronous electric motor mechanically coupled to an actuator to transfer torque thereto includes controlling operation of the electric motor with a sensorless electric motor drive control system, estimating an initial phase angle and a rotational speed of a rotor of the electric motor, monitoring operation of the sensorless electric motor drive control system and the electric motor using the estimated initial phase angle and the estimated rotational speed of the rotor of the electric motor, and detecting a fault in one of the sensorless electric motor drive control system and the electric motor based upon the monitored operation.

BRIEF DESCRIPTION OF THE DRAWINGS

One or more embodiments will now be described, by way of example, with reference to the accompanying drawings, in which.

DETAILED DESCRIPTION

Figure 1:
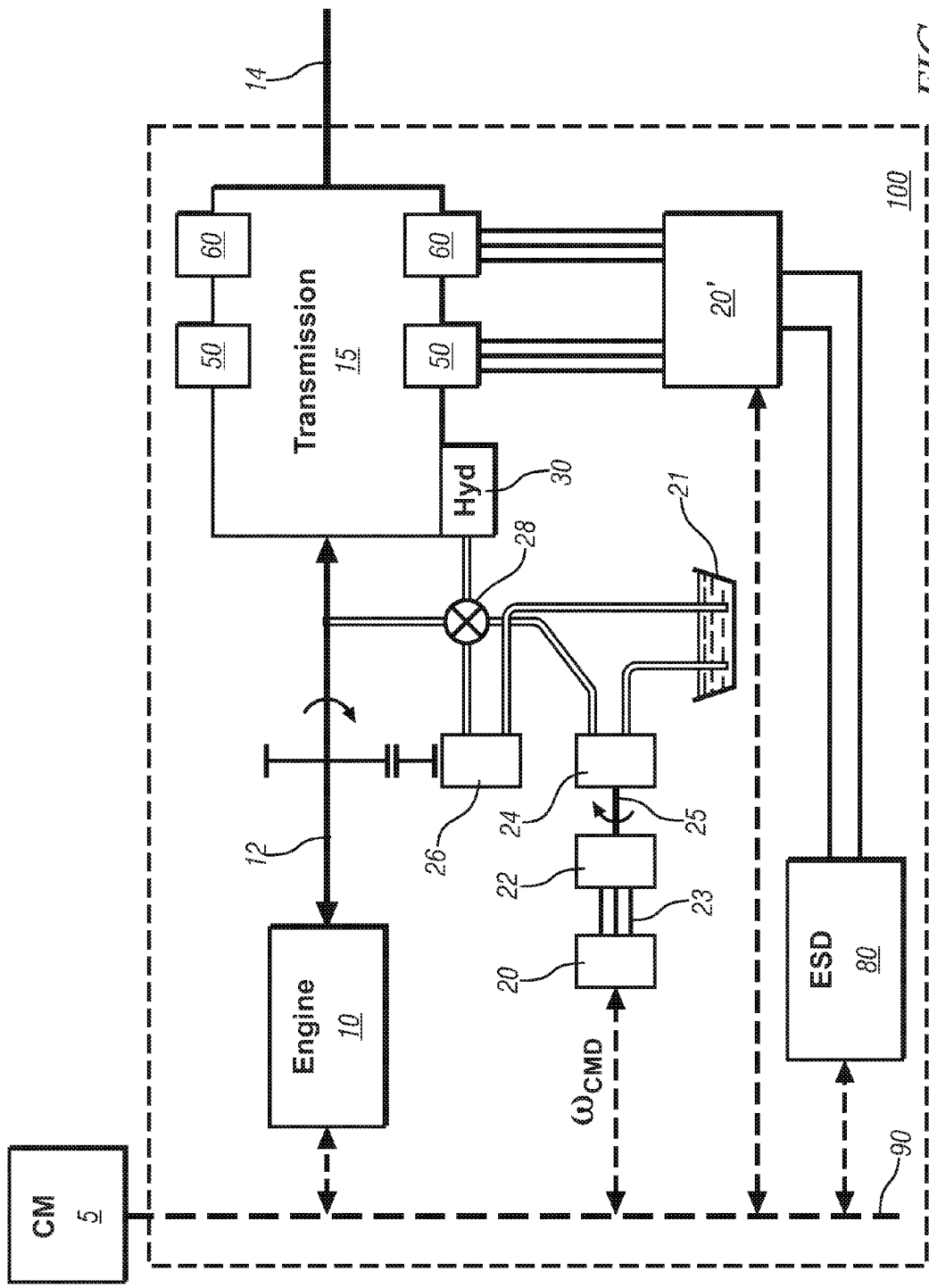
FIG. 1 is a two-dimensional schematic diagram of a hybrid powertrain system including an auxiliary hydraulic pump system, in accordance with the present disclosure.

Referring now to the drawings, wherein the showings are for the purpose of illustrating certain exemplary embodiments only and not for the purpose of limiting the same, FIG. 1 schematically illustrates an exemplary hybrid powertrain system 100. The hybrid powertrain system 100 includes an internal combustion engine 10 coupled to a hybrid transmission 15 via a rotatable input member 12. The hybrid transmission 15 in one embodiment includes first and second electrically-powered torque machines 50 and 60 that are configured to transfer torque thereto. The hybrid transmission 15 is configured to transfer mechanical power and torque between the engine 10, the first and second electrically-powered torque machines 50 and 60 and an output member 14 in response to operator commands and system requirements. This can include operating the hybrid powertrain system 100 to generate tractive torque when the engine 10 is off, i.e., not spinning and not producing or consuming torque or power. In one embodiment, mechanical power from the engine 10 can be transferred to the hybrid transmission 15 and one or both of the first and second electrically-powered torque machines 50 and 60. Mechanical power from the first and second electrically-powered torque machines 50 and 60 can be transferred to the hybrid transmission 15 and the engine 10. Mechanical power can be transferred between the engine 10, the first and second electrically-powered torque machines 50 and 60 and the hybrid transmission 15 to a driveline via the output member 14.

The first and second electrically-powered torque machines 50 and 60 are each electrically connected to an electric power inverter 20' that is connected to a high-voltage electric energy storage device (ESD) 80 via a high-voltage bus. The first and second electrically-powered torque machines 50 and 60 are permanent magnet three-phase synchronous motors including resolvers for monitoring rotational position in one embodiment.

The hybrid powertrain system 100 includes one or more auxiliary systems each including a multiphase alternating current permanent magnet synchronous electric motor configured for sensorless control that is coupled to an actuator device to transfer torque thereto. In operation, the auxiliary system is commanded to an operating state, e.g., to a hydraulic pressure, and the electric motor is commanded to operate at a rotational speed that is responsive to the commanded operating state of the auxiliary system based upon operating characteristics of the actuator device.

In one embodiment, the auxiliary system is an auxiliary hydraulic pump system that is an element of a hydraulic circuit (Hyd) 30. The hydraulic circuit (Hyd) 30 selectively transfers pressurized hydraulic fluid at preferred pressure levels and flowrates to activate and deactivate selected torque transfer devices, e.g., clutches for the hybrid transmission 15. The auxiliary hydraulic pump system includes an actuator device including a hydraulic pump element 24 rotatably coupled to an electric motor 22 via a shaft 25. The pressurized hydraulic fluid is supplied from a mechanically-driven hydraulic pump element 26 coupled to the input member 12 and the auxiliary hydraulic pump system including the electrically-driven hydraulic pump element 24 rotatably coupled to the electric motor 22. The mechanically-driven hydraulic pump element 26 and the electrically-driven hydraulic pump element 24 each draw hydraulic fluid from a sump 21. The electric motor 22 is electrically connected via electric cables 23 to an electric power inverter 20 that is connected to the high-voltage electric energy storage device (ESD) 80 via a high-voltage bus. The electric motor 22 is a sensorless permanent magnet three-phase synchronous motor including a stator and a rotor and lacking any resolvers or other sensing devices for monitoring rotational position.

A control module 5 is signally connected to each of the engine 10, transmission 15, and the electric power inverters 20, 20' via a communications bus 90 to transfer information in the form of input signals from sensors and control signals for actuators associated therewith. It is understood that information transfer to and from the control module 5 can be accomplished by one or more communications paths, including using a direct connection, using a local area network bus and using a serial peripheral interface bus.

To operate the electric motor 22, DC power is supplied from the ESD 80 to the electric power inverter 20, which converts the DC power into AC power that is transferred to the stator of the electric motor 22. As will be appreciated by one skilled in the art, the conversion of DC power to AC power is substantially performed by controlling switches, e.g., high-power transistors within the electric power inverter 20 at a switching frequency, such as, for example, 12 kilohertz (kHz). The control module 5 generates a control signal that is a rotational speed command $\omega_{CMD}$ that is converted to a pulsewidth-modulated (PWM) signal to control the switching action of the electric power inverter 20 and thus power the electric motor 22 to drive the hydraulic pump element 24.

The control module 5 may take any suitable form including various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit (s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figures 2, 3A:
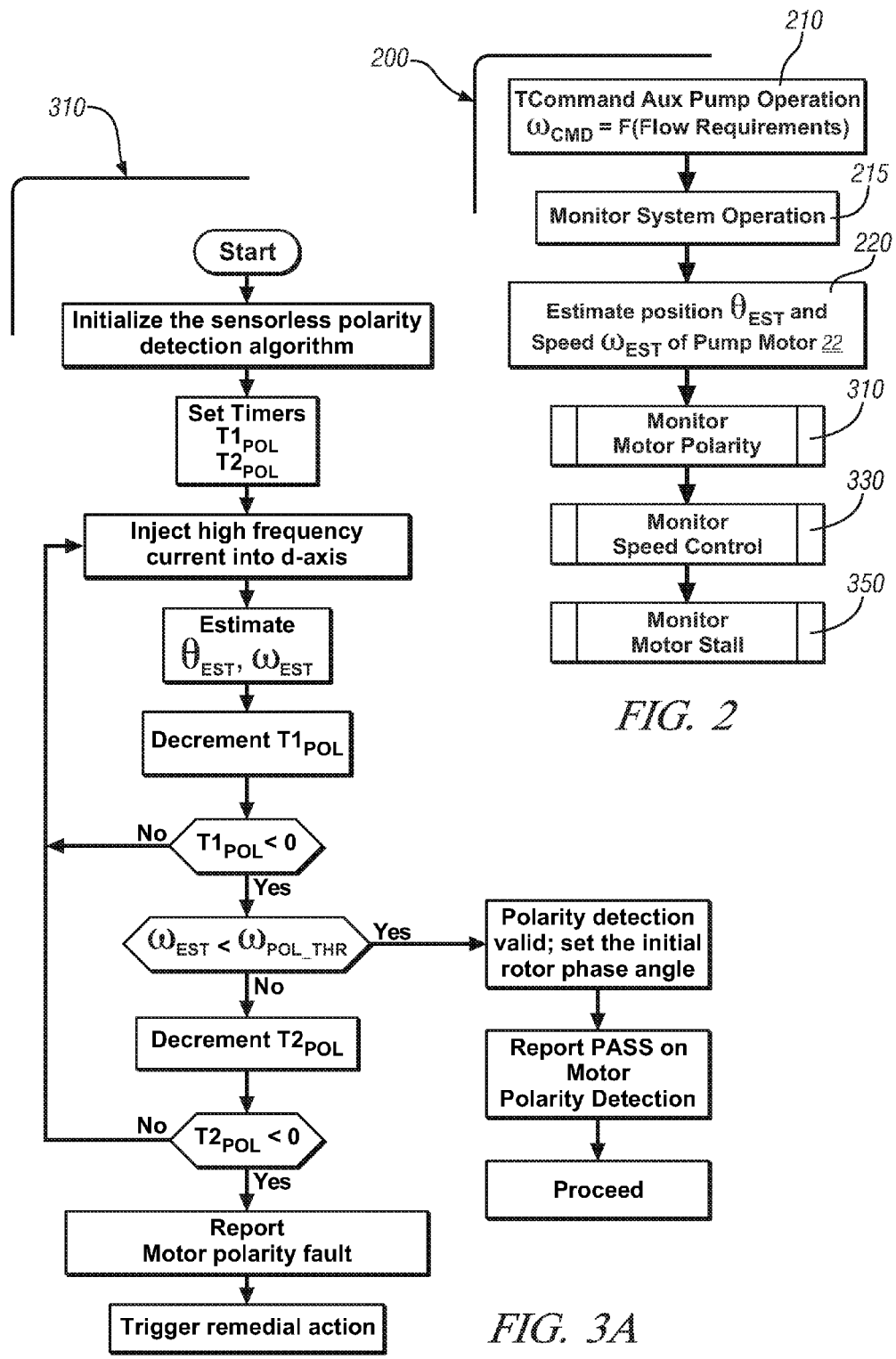
FIG. 2 is a schematic flowchart for monitoring operation of the auxiliary hydraulic pump system including an electric motor and a hydraulic pump element, in accordance with the present disclosure.
FIG. 3A is a schematic flowchart for monitoring polarity of the electric motor, in accordance with the present disclosure.

FIG. 2 schematically shows a flowchart 200 for monitoring operation of the auxiliary hydraulic pump system including the electric motor 22 and the hydraulic pump element 24. In operation the control module 5 generates the control signal $\omega_{CMD}$ that is communicated to the electric power inverter 20 to control operation of the electric motor 22 and thus operation of the hydraulic pump element 24. The control signal $\omega_{CMD}$ and hence operation of the hydraulic pump element 24 is determined based upon hydraulic fluid flow requirements in the hydraulic circuit 30. The hydraulic fluid flow requirements either supplement or supplant hydraulic flow requirements from the mechanically-driven hydraulic pump element 26, e.g., when the engine 10 is in an engine-off state, and during cold ambient operating conditions when the flow from the mechanically-driven hydraulic pump element 26 is insufficient to operate the hydraulic circuit 30. As previously stated, the electric motor 22 is sensorless, i.e., lacks any additional sensing device (for example an encoder) for monitoring rotational position and speed (210).

Operation of the auxiliary hydraulic pump system including the electrically-driven hydraulic pump element 24 coupled to the sensorless electric motor 22 is monitored (215). This monitoring is described with reference to FIGS. 5 and 6.

The control scheme for monitoring operation of the auxiliary hydraulic pump system including the electric motor 22 and the hydraulic pump element 24 includes a first diagnostic scheme (Monitor Motor Polarity) 310 for monitoring an estimation of the rotational speed of the electric motor 22, a second diagnostic scheme (Monitor Speed Control) 330 for monitoring operation of the sensorless electric motor drive system for the electric motor 22, and a third diagnostic scheme (Monitor Motor Stall) 350 for monitoring operation of the electric motor 22 rotatably coupled to the hydraulic pump element 24, indicating a motor stall.

FIG. 3A shows the first diagnostic scheme (Monitor Motor Polarity) 310 for monitoring the electric motor 22, including monitoring polarity of the electric motor 22 to verify whether an initial rotor position $\theta_{EST}$ or phase angle of a rotor of the electric motor 22 is correct. This process includes setting polarity detection timers to first and second calibrated times $T1_{POL}$ and $T2_{POL}$, after initialization. In one embodiment, the rotor position $\theta_{EST}$ and rotational speed $\omega_{EST}$ of the rotor of the electric motor 22 can be estimated by injecting a high frequency current into a d-axis of an electrical current that is input from the control module 100 to the sensorless electric motor drive control system for the electric motor 22, which is described with reference to FIGS. 5 and 6. When the first calibrated time $T1_{POL}$, has elapsed, the estimated rotational speed $\omega_{EST}$ is compared to a high-speed threshold $\omega_{POL\_THR}$ associated with the motor polarity. So long as the estimated rotational speed $\omega_{EST}$ is less than the high-speed threshold $\omega_{POL\_THR}$, the initial polarity detection is considered valid, and an initial rotor phase angle $\theta_{INIT}$ can be set. A valid initial polarity detection indicates that the initial rotor position $\theta_{EST}$ or phase angle is correct. Thus the first diagnostic scheme 310 for monitoring polarity of the electric motor 22 has been passed, permitting subsequent execution of the second and third diagnostic control schemes 330 and 350 using the estimates of the rotor position $\theta_{EST}$ and rotational speed $\omega_{EST}$ of the electric motor 22. However, when the second calibrated time $T2_{POL}$ has elapsed with the estimated rotational speed $\omega_{EST}$ greater than the high-speed threshold $\omega_{POL\_THR}$, the initial polarity detection is considered invalid, and a fault is detected, triggering remedial action and reporting a fault. An invalid initial polarity detection indicates that the initial rotor position $\theta_{EST}$ or phase angle is incorrect, i.e., is 180° out of phase. Preferably the estimated rotational speed $\omega_{EST}$ is less than 100 RPM when the first diagnostic scheme 310 is executed. When a fault is detected that is associated with monitoring the initial rotor position $\theta_{EST}$ or phase angle of the electric motor 22, the estimates of the rotor position $\theta_{EST}$ and rotational speed $\omega_{EST}$ are unusable to monitor operation of the electric motor 22 and the associated hydraulic pump element 24. Such faults can be associated with an error in estimating the rotor position $\theta_{EST}$, and include faults associated with execution of the control algorithm, measurement errors and noise, or an unstable signal for the rotational speed command $\omega_{CMD}$. Reporting the detected fault can include notifying a vehicle operator.

Figure 3B:
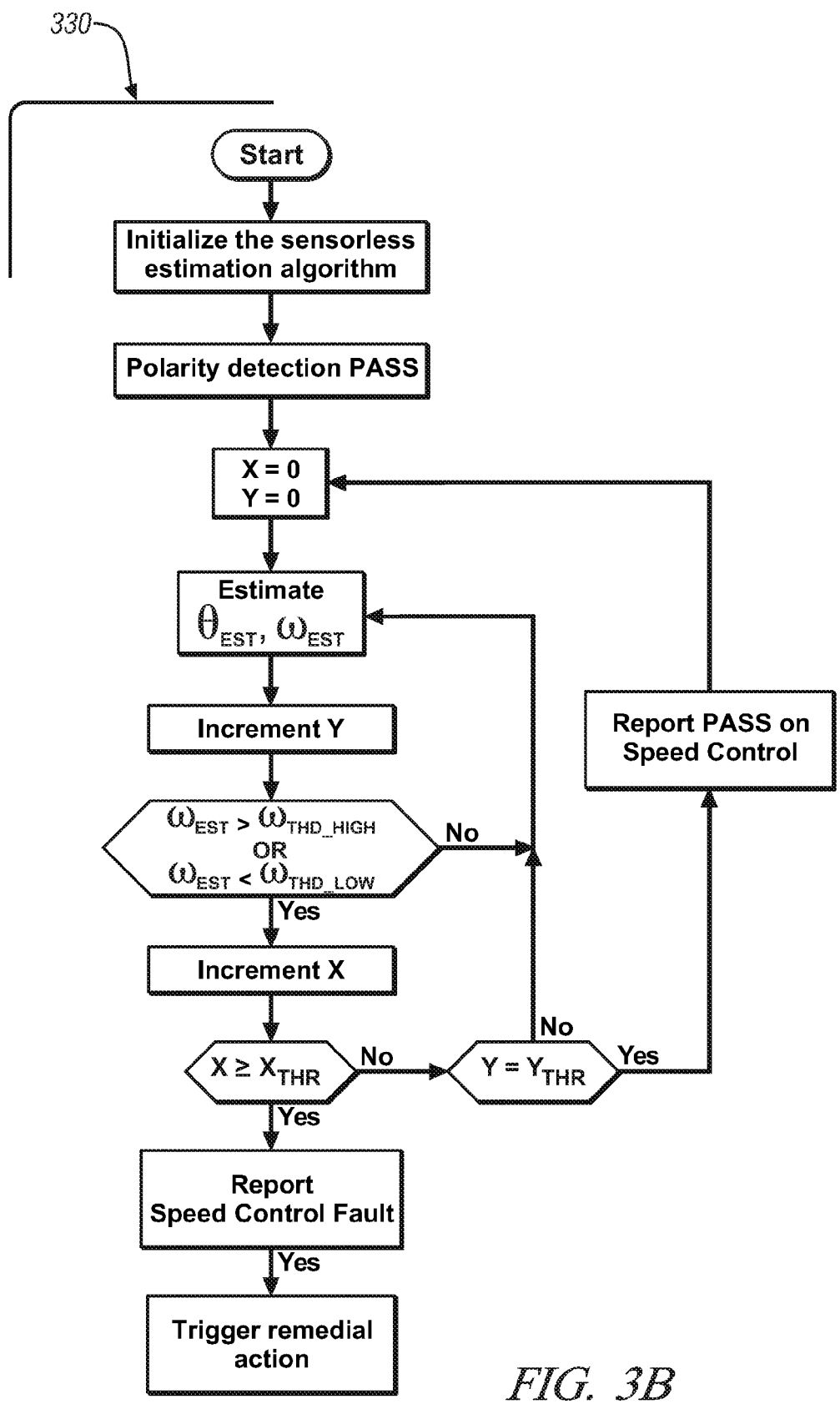
FIG. 3B is a schematic flowchart for monitoring operation of the sensorless electric motor drive system to detect a loss of speed control associated with operating the electric motor, in accordance with the present disclosure.

FIG. 3B shows the second diagnostic scheme (Monitor Speed Control) 330 for monitoring operation of the sensorless electric motor drive system for the electric motor 22, subsequent to passing the first diagnostic scheme 310 for monitoring polarity of the electric motor 22 (PASS on Sensorless Polarity Detection). The second diagnostic scheme 330 executes to detect a loss of speed control associated with operating the electric motor 22. In operation, second diagnostic scheme 330 includes periodically estimating the rotor position $\theta_{EST}$ and rotational speed $\omega_{EST}$ of the electric motor 22, as described herein. The estimated rotational speed $\omega_{EST}$ of the electric motor 22 is compared to a high-speed threshold $\omega_{THD\_HIGH}$ and a low-speed threshold $\omega_{THD\_LOW}$. An XY fault counter provides signal debouncing to accommodate measurement noise. In the second diagnostic scheme 330, the XY counter is used to count any excursions of the estimated rotational speed $\omega_{EST}$ of the electric motor 22 greater than the high-speed threshold $\omega_{THD\_HIGH}$ or less than the low-speed threshold $\omega_{THD\_LOW}$. So long as there are less than a calibrated quantity of X excursions ($X_{THR}$) of the estimated rotational speed $\omega_{EST}$ of the electric motor 22 greater than the high-speed threshold $\omega_{THD\_HIGH}$ or less than the low-speed threshold $\omega_{THD\_LOW}$ during Y periodic observations ($Y_{THR}$) of the estimated rotational speed $\omega_{EST}$, the operation of the sensorless electric motor drive system for the electric motor 22 passes the second diagnostic scheme 330. Alternatively, a fault associated with operation of the sensorless electric motor drive system for the electric motor 22 is detected when there is greater than a calibrated quantity of X excursions of the estimated rotational speed $\omega_{EST}$ of the electric motor 22 greater than the high-speed threshold $\omega_{THD\_HIGH}$ or less than the low-speed threshold $\omega_{THD\_LOW}$ during Y periodic observations of the estimated rotational speed $\omega_{EST}$. A fault associated with operation of the sensorless electric motor drive system for the electric motor 22 indicates the estimation of the rotor position $\theta_{EST}$ and rotational speed $\omega_{EST}$ of the electric motor 22 diverges from the rotational speed command $\omega_{CMD}$. A fault associated with the second diagnostic scheme 330 can indicate that there is a loss of speed control of the operation of the sensorless electric motor drive system for the electric motor 22.

Figure 3C:
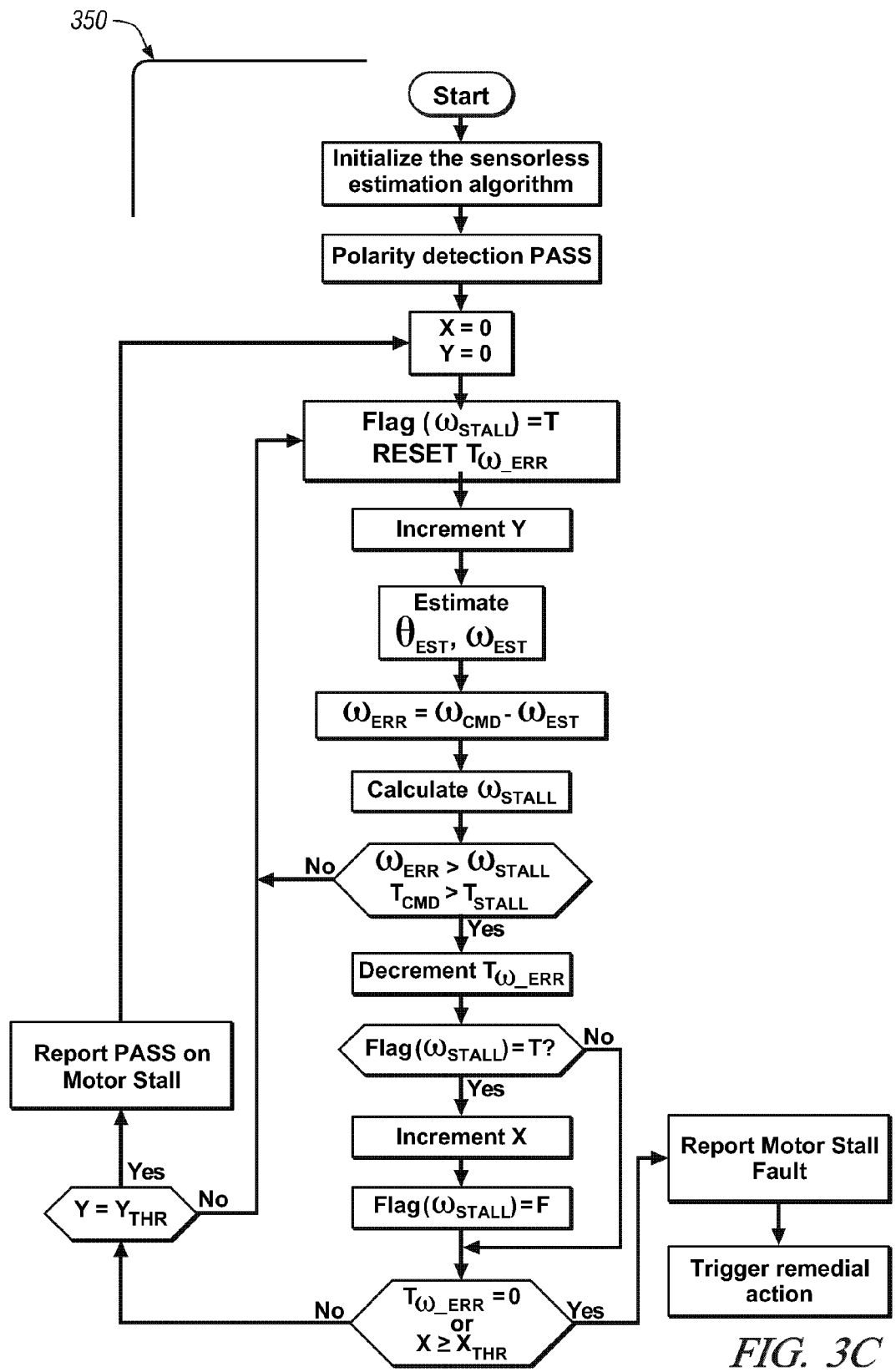
FIG. 3C is a schematic flowchart for monitoring operation of the electric motor to detect a stall condition associated with the electric motor, in accordance with the present disclosure.

FIG. 3C shows the third diagnostic scheme (Monitor Motor Stall) 350 for monitoring operation of the electric motor 22 rotatably coupled to the hydraulic pump element 24 subsequent to passing the first diagnostic scheme 310 for monitoring polarity of the electric motor 22 and preferably subsequent to passing the second diagnostic scheme 330 for monitoring speed control of the electric motor 22. The third diagnostic scheme 350 executes to detect a stall condition associated with the electric motor 22. A stall speed flag FLAG ($\omega_{STALL}$) and a speed error timer $T_{\omega\_ERR}$ are initialized prior to estimating the rotor position $\theta_{EST}$ and rotational speed $\omega_{EST}$ of the electric motor 22. A speed error $\omega_{ERR}$ is calculated as a difference between the rotational speed command $\omega_{CMD}$ and the estimated rotational speed $\omega_{EST}$ of the electric motor 22. A stall speed threshold $\omega_{STALL}$ for the electric motor 22 is calculated as a function of the rotational speed command $\omega_{CMD}$. The commanded torque $T_{CMD}$ is compared to a stall torque threshold $T_{STALL}$ to ensure that the control scheme is presently commanding operation of the auxiliary hydraulic pump system including the hydraulic pump element 24 rotatably coupled to the electric motor 22 to deliver pressurized hydraulic fluid.

The speed error $\omega_{ERR}$ is compared to the stall speed threshold $\omega_{THD}$ to identify occurrences of the estimated rotational speed $\omega_{EST}$ falling below the stall speed threshold $\omega_{STALL}$. This comparison is valid only when the electric motor 22 is commanded to generate torque sufficient to operate the hydraulic pump element 24 to generate flow of hydraulic fluid. In the third diagnostic scheme 350, an XY fault counter is used to count instances of the estimated rotational speed $\omega_{EST}$ falling below the stall speed threshold $\omega_{STALL}$. So long as there is less than a calibrated quantity of X excursions of the estimated rotational speed $\omega_{EST}$ falling below the stall speed threshold $\omega_{STALL}$ during Y periodic observations of the estimated rotational speed $\omega_{EST}$ within the time period defined by the speed error timer $T_{\omega\_ERR}$, the speed control of the electric motor 22 and the associated hydraulic pump element 24 pass the third diagnostic scheme 350. Alternatively, a fault associated with the speed control of the sensorless electric motor drive system for the electric motor 22 is detected when there is greater than a calibrated quantity of X excursions of the estimated rotational speed $\omega_{EST}$ falling below the stall speed threshold $\omega_{STALL}$ during Y periodic observations of the estimated rotational speed $\omega_{EST}$ occurring within the time period defined by the speed error timer $T_{\omega\_ERR}$. Such faults include a fault with the electric motor 22 such that it cannot deliver sufficient torque to maintain motor speed in response to the commanded motor torque, and thus cannot deliver pressurized hydraulic fluid to the hydraulic circuit 30.

Figure 4:
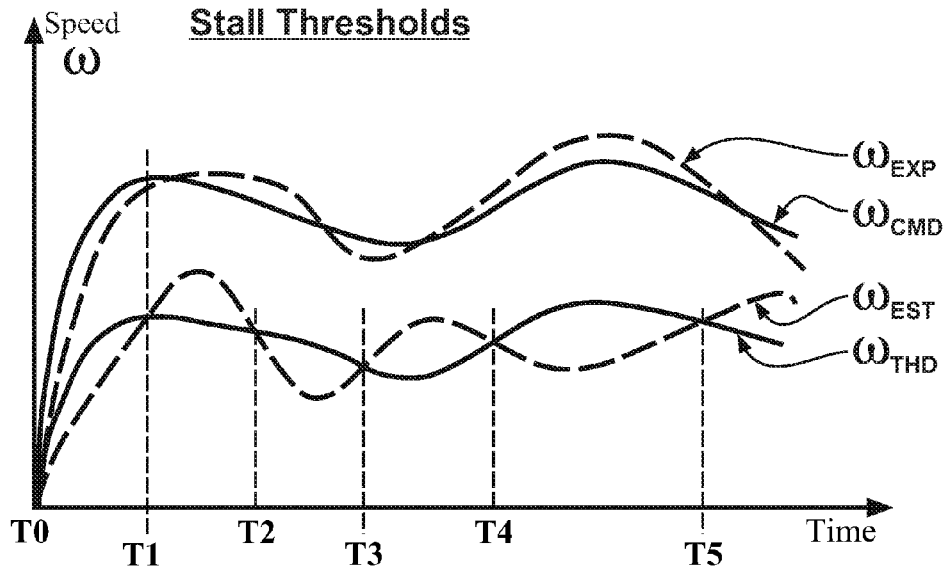
FIG. 4 is a datagraph associated with operation of an exemplary system, including time-based changes in rotational speeds associated with the electric motor, in accordance with the present disclosure.

FIG. 4 graphically shows data associated with operation of an exemplary system, including the commanded rotational speed $\omega_{CMD}$, an expected rotational speed $\omega_{EXP}$ associated with the commanded rotational speed $\omega_{CMD}$, an associated stall speed threshold $\omega_{THD}$, and an estimated rotational speed $\omega_{EST}$. The stall timer is activated between times T2 and T3, and between times T4 and T5, when the estimated rotational speed $\omega_{EST}$ is less than the stall speed threshold $\omega_{STALL}$. Remedial action in the event of occurrence of a fault associated with any one of the first, second, and third diagnostic schemes 310, 330, and 350 can include preventing the engine from executing an autostop function during ongoing vehicle operation.

Figure 5:
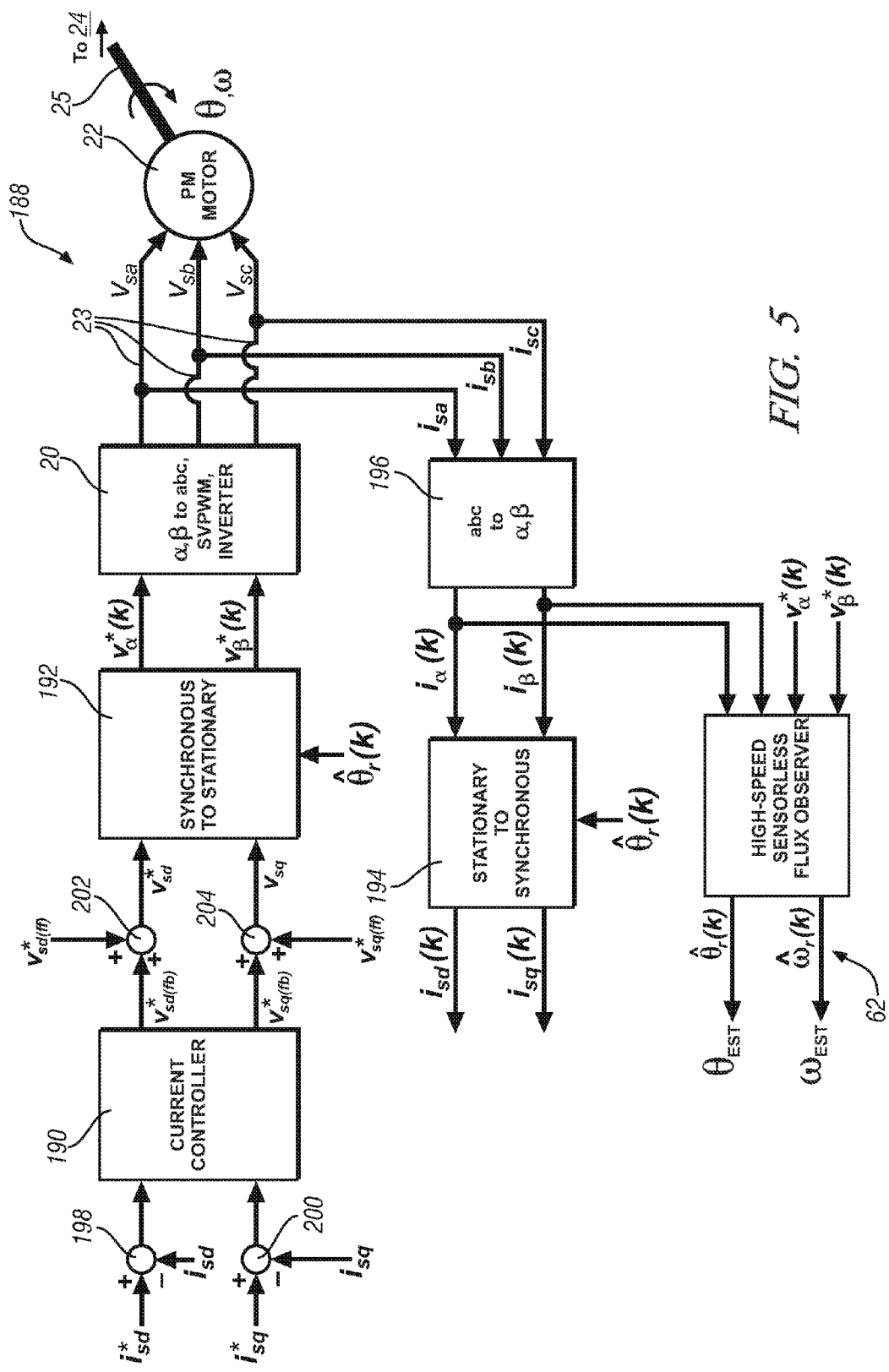
FIG. 5 schematically illustrates a sensorless electric motor drive system including a scheme for controlling and monitoring operation of the exemplary auxiliary hydraulic pump system, in accordance with the present disclosure.

FIG. 5 illustrates an embodiment of a sensorless electric motor drive system 188 that includes a scheme for controlling and monitoring operation of the exemplary auxiliary hydraulic pump system including the electrically-driven hydraupump element 24 coupled to the sensorless electric motor (PM Motor) 22. In overall operation, the commanded rotational speed $\omega_{CMD}$ is generated and transformed into current commands, $i^*_{sd}$ and $i^*_{sq}$, which are DC quantities. The current commands are inputs to a current controller 190, which generates associated voltage commands $v^*_{sd}$ and $v^*_{sq}$, which are also DC quantities. The voltage commands are input to a rotational transformation block (Synchronous to Stationary) 192, which are input to the electric power inverter 20 to generate two-phase AC voltage commands, $v^*_\alpha$ and $v^*_\beta$. The electric power inverter 20 transforms the two-phase AC voltage commands, $v^*_\alpha$ and $v^*_\beta$ into three-phase AC quantities a, b, c, including PWM control of the switch voltages (SVPWM) for switches of the inverter 20.

Estimating a rotor position of a permanent magnet three-phase AC machine includes calculating or estimating currents and voltages (i.e., commanded or measured) within the electric motor 22. An estimated flux is compared with a measured flux to determine a flux error. The estimated flux and back-emf are updated based on a flux and back-emf increment from the motor model and the flux error. The sensorless electric motor drive system 188 includes the current controller 190, rotor transformation blocks (Synchronous to Stationary) 192 and (Stationary to Synchronous) 194, a phase conversion block (abc to $\alpha$, $\beta$) 196, the power inverter 20 (including a two-to-three phase conversion and PWM generation), the electric motor 22, a position and speed estimator 62, and summers 198, 200, 202 and 204.

In operation the commanded rotational speed $\omega_{CMD}$ is generated and transformed into current commands, $i^*_{sd}$ and $i^*_{sq}$, which are DC quantities. The phase conversion block 196 transforms three-phase currents sampled from the electric motor 22 into two-phase currents. The rotational transformation block 194 provides the rotational transformation (e.g., stationary to synchronous frames) with respect to the rotor position to change the two-phase AC currents, $i_\alpha(k)$ and $i_\beta(k)$, into two-phase DC currents, $i_{sd}$ and $i_{sq}$, which are used as current feedback at summers 198 and 200.

The difference between the current command and the current feedback drives the current controller 190 to generate the voltage commands, $v^*_{sd}$ and $v^*_{sq}$, which are also DC quantities. At summers 202 and 204, feedforward terms (or decoupling voltages) $v^*_{sd(f)}$ and $v^*_{sq(f)}$ are used to decouple the voltage induced by flux inside the electric motor 22 at the output of the current controller 190. The feedforward terms are calculated from a flux table, $\Psi_d$ and $\Psi_q$ as follows.

$$v^*_{sd(f)} = -\omega_r \Psi_q(i_{sd}, i_{sq}) \quad [1]$$

$$v^*_{sq(f)} = \omega_r \Psi_d(i_{sd}, i_{sq}) \quad [2]$$

The commanded currents are used in Eqs. 1 and 2, and the decoupling voltages calculated using the commanded currents may result in oscillatory current control response at high speed operation.

The three-phase AC voltage is used to drive the electric motor 22, so an inverse-rotational transform (e.g., synchronous to stationary frames) from $v^*_{sd}$ and $v^*_{sq}$, to $v^*_\alpha$ and $v^*_\beta$ with respect to the rotor position is performed by rotational transformation block 192. These two-phase AC voltage commands, $v^*_\alpha$ and $v^*_\beta$, are then transformed into three-phase AC quantities by the inverter 20. The position and speed estimator 62 uses the outputs of rotational transformation block 192 and the phase conversion block 196 to estimate the flux and back-emf in the electric motor 22.

Figure 6:
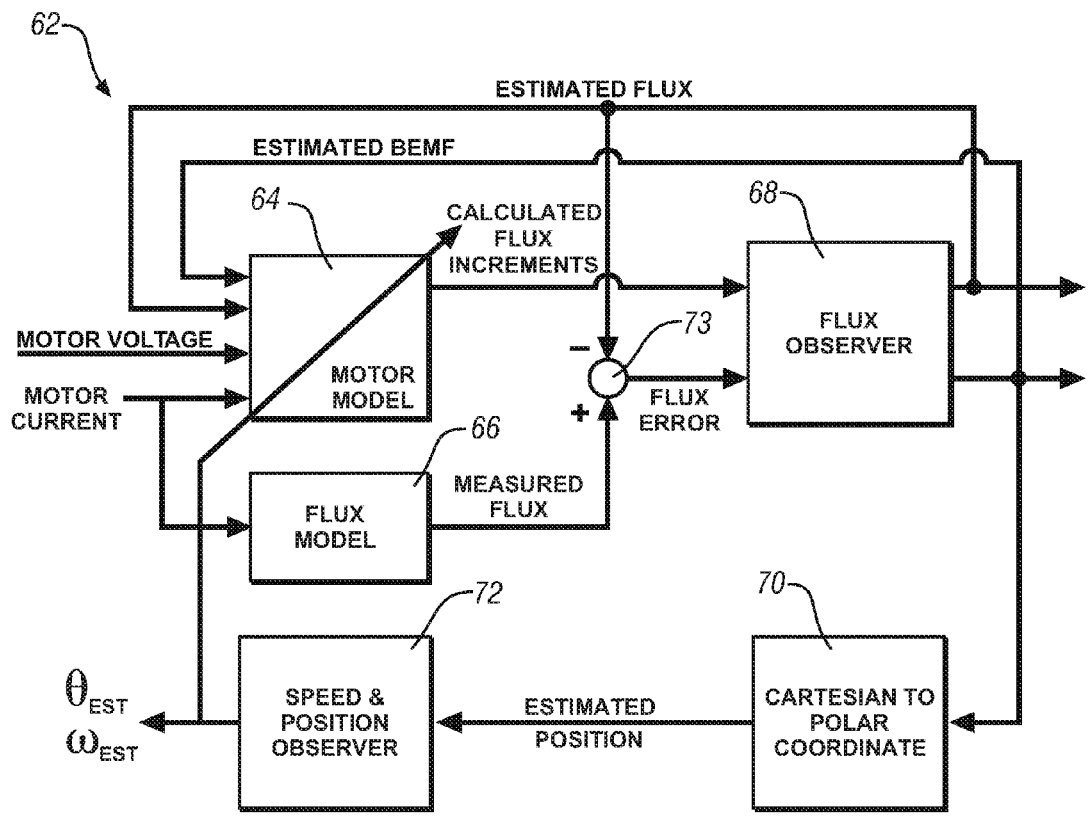
FIG. 6 schematically illustrates a position and speed estimator for estimating the rotor position and speed of the electric motor, in accordance with the present disclosure.

FIG. 6 schematically shows details of the position and speed estimator 62 for estimating the rotor position and speed of the electric motor 22 depicted in FIG. 5. The position and speed estimator 62 includes a motor model 64, a flux model 66, a flux observer 68, a coordinate conversion 70, and a speed and position observer 72. In one embodiment, the position and speed estimator 62 uses the calculations of flux and back-emf implemented at a synchronously rotating reference frame made by the flux observer 68.

The motor model 64 receives motor voltage and motor current as inputs, along with an estimated flux and back-emf from the flux observer 68. The motor model 64 generates increments of the flux and the back-emf for each sampling time, e.g., each cycle of the PWM signal, which it sends to the flux observer 68. The flux model 66 receives the motor current as an input and generates a measure of the motor flux from, for example, the aforementioned flux table. A flux error is calculated from the difference of the estimated flux from the flux observer 68 and the measured flux from the flux model 66 at summer 73. The measured flux, or flux quantity, is also used as a feedforward control or decoupling current of the current control for the electric motor 22. The flux error and the increments from the motor model 64 are received as input by the flux observer 68, which estimates the motor flux and back-emf.

The estimated flux takes into account the flux generated by the windings in the stator of the electric motor 22, whereas the flux generated by the permanent magnets in the electric motor 22 is excluded from the estimated flux. One advantage of this method is that the estimated flux is not dependent on the temperature of the motor magnets, as it is determined by the geometry of the electric motor 22 and the material properties of the stator and rotor core thereof. The estimated back-emf corresponds to the voltage induced by the permanent magnet flux, and its angle contains the position estimation error. The estimated position error is then sent to the speed and position observer 72 to estimate the rotor position and speed. Because the magnitude of the estimated back-emf is not used in the position and speed estimation, the temperature variation of the rotor, especially the permanent magnet, does not affect the estimation of the rotor position $\theta_{EST}$ and rotational speed $\omega_{EST}$.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a multiphase alternating current permanent magnet synchronous electric motor mechanically coupled to an actuator to transfer torque thereto, comprising:
controlling operation of the electric motor with a sensorless electric motor drive control system;
estimating an initial phase angle and a rotational speed of a rotor of the electric motor;
monitoring operation of the sensorless electric motor drive control system and the electric motor using the estimated initial phase angle and the estimated rotational speed of the rotor of the electric motor, comprising:
commanding the sensorless electric motor drive control system to operate the electric motor at a commanded operating speed,
determining a stall speed threshold associated with the commanded operating speed, and detecting a stall condition associated with the electric motor comprising detecting the estimated rotational speed of the rotor is less than the stall speed threshold; and detecting a fault in one of the sensorless electric motor drive control system and the electric motor based upon the monitored operation.

2. The method of claim 1, further comprising:

monitoring a polarity of the estimated initial phase angle of the rotor; and verifying the estimated initial phase angle of the rotor is correct based upon the polarity of the estimated initial phase angle of the rotor.

3. The method of claim 2, wherein monitoring operation of the sensorless electric motor drive control system and the electric motor occurs only when the monitored polarity of the estimated initial phase angle of the rotor is verified as correct.

4. The method of claim 3, wherein controlling operation of the electric motor with a sensorless electric motor drive control system occurs only when the monitored polarity of the initial phase angle of the rotor is verified as correct.

5. The method of claim 2, wherein monitoring the polarity of the estimated initial phase angle of the rotor comprises:

injecting a high frequency current into a d-axis of an electrical current that is input to the sensorless electric motor drive control system;

estimating rotational speed of the rotor of the electric motor when a calibrated time associated with a polarity detection timer has elapsed;

comparing the estimated rotational speed to a threshold speed associated with motor polarity; and determining the initial polarity detection is valid when the estimated rotational speed is less than the threshold speed.

6. The method of claim 1, wherein monitoring operation of the sensorless electric motor drive control system further comprises:

commanding the sensorless electric motor drive control system to operate the electric motor at a commanded operating speed; and comparing the estimated rotational speed of the rotor to the commanded operating speed.

7. The method of claim 6, further comprising detecting a fault associated with the sensorless electric motor drive control system when the estimated rotational speed of the rotor diverges from the commanded operating speed.

8. The method of claim 1, wherein detecting the stall condition associated with the electric motor further comprises detecting that the electric motor cannot deliver sufficient torque to the actuator to maintain rotational speed of the rotor of the electric motor in response to a commanded motor torque.

9. Method for monitoring an auxiliary system associated with a powertrain including an internal combustion engine coupled to a hybrid transmission, the auxiliary system including a sensorless electric motor drive control system controlling operation of an electric motor coupled to an actuator to transfer torque to the actuator, the method comprising:

commanding the electric motor to operate the actuator at a commanded auxiliary system operating state, wherein the commanded auxiliary system operating state comprises a commanded operating speed and torque;

estimating an initial phase angle and a rotational speed of a rotor of the electric motor;

monitoring operation of the sensorless electric motor drive control system and the electric motor using the estimated initial phase angle and the estimated rotational speed of the rotor of the electric motor, wherein monitoring operation of the electric motor comprises determining a stall speed threshold associated with the commanded operating speed and detecting a stall condition associated with the electric motor and the actuator when the estimated rotational speed of the rotor of the electric motor is less than the stall speed threshold; and detecting a fault in one of the sensorless electric motor drive control system and the electric motor based upon the monitored operation.

10. The method of claim 9, further comprising:

monitoring a polarity of the estimated initial phase angle of the rotor; and verifying the estimated initial phase angle of the rotor is correct based upon the polarity of the estimated initial phase angle of the rotor.

11. The method of claim 10, wherein monitoring operation of the sensorless electric motor drive control system and the electric motor occurs only when the monitored polarity of the estimated initial phase angle of the rotor is verified as correct.

12. The method of claim 11, wherein commanding the electric motor to operate the actuator at the commanded auxiliary system operating state occurs only when the monitored polarity associated with the initial phase angle of the rotor is verified as correct.

13. The method of claim 9, wherein the commanded auxiliary system operating state comprises a commanded operating speed, and monitoring operation of the sensorless electric motor drive control system comprises comparing the estimated rotational speed of the rotor of the electric motor to the commanded rotational speed.

14. The method of claim 9, wherein the actuator comprises a hydraulic pump element to provide pressurized hydraulic fluid to the hybrid transmission.

* * * * *